UNITED STATES PATENT OFFICE.

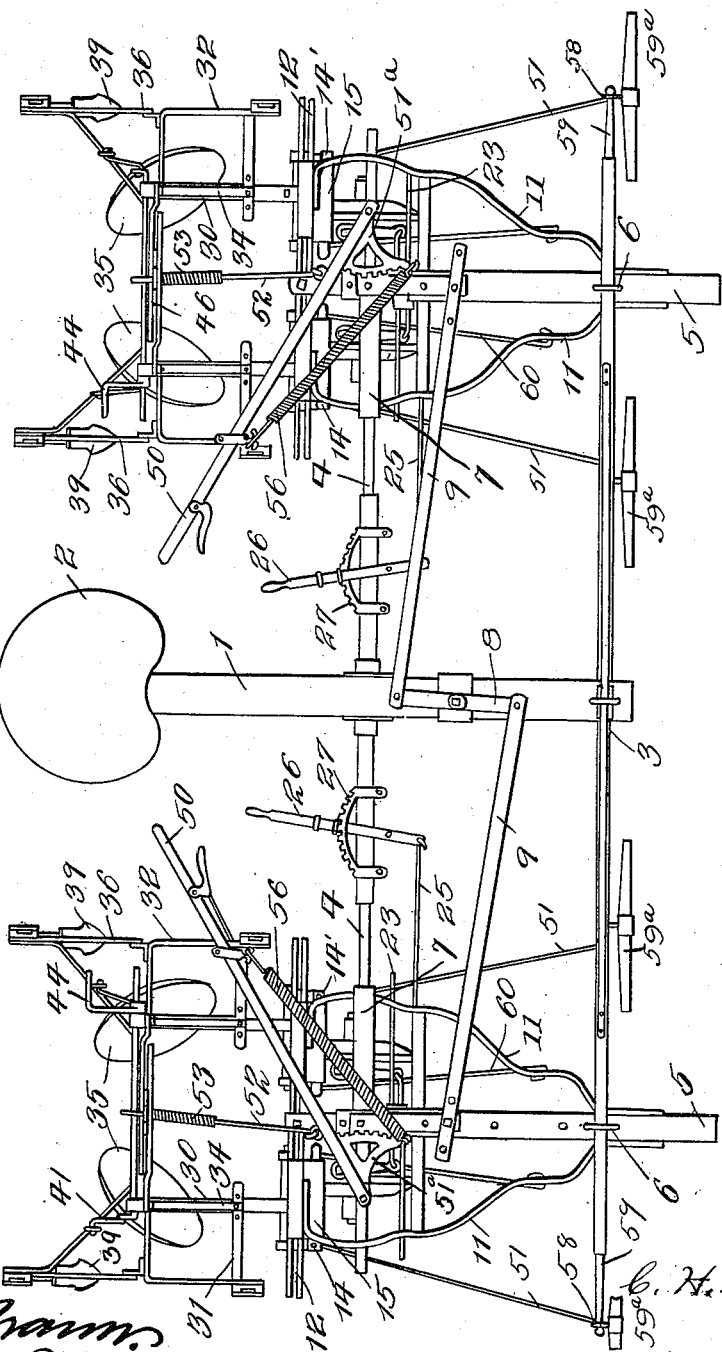

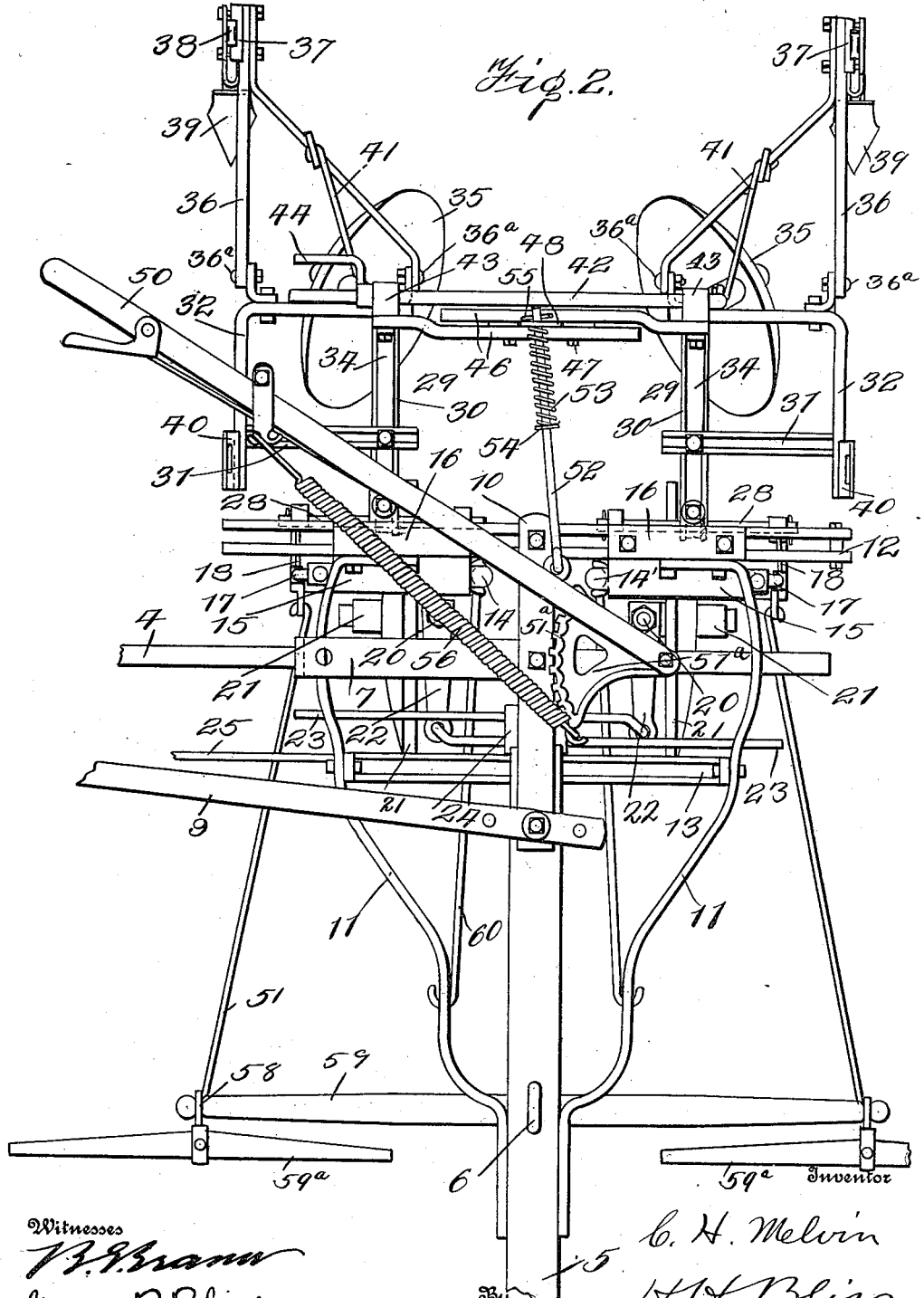

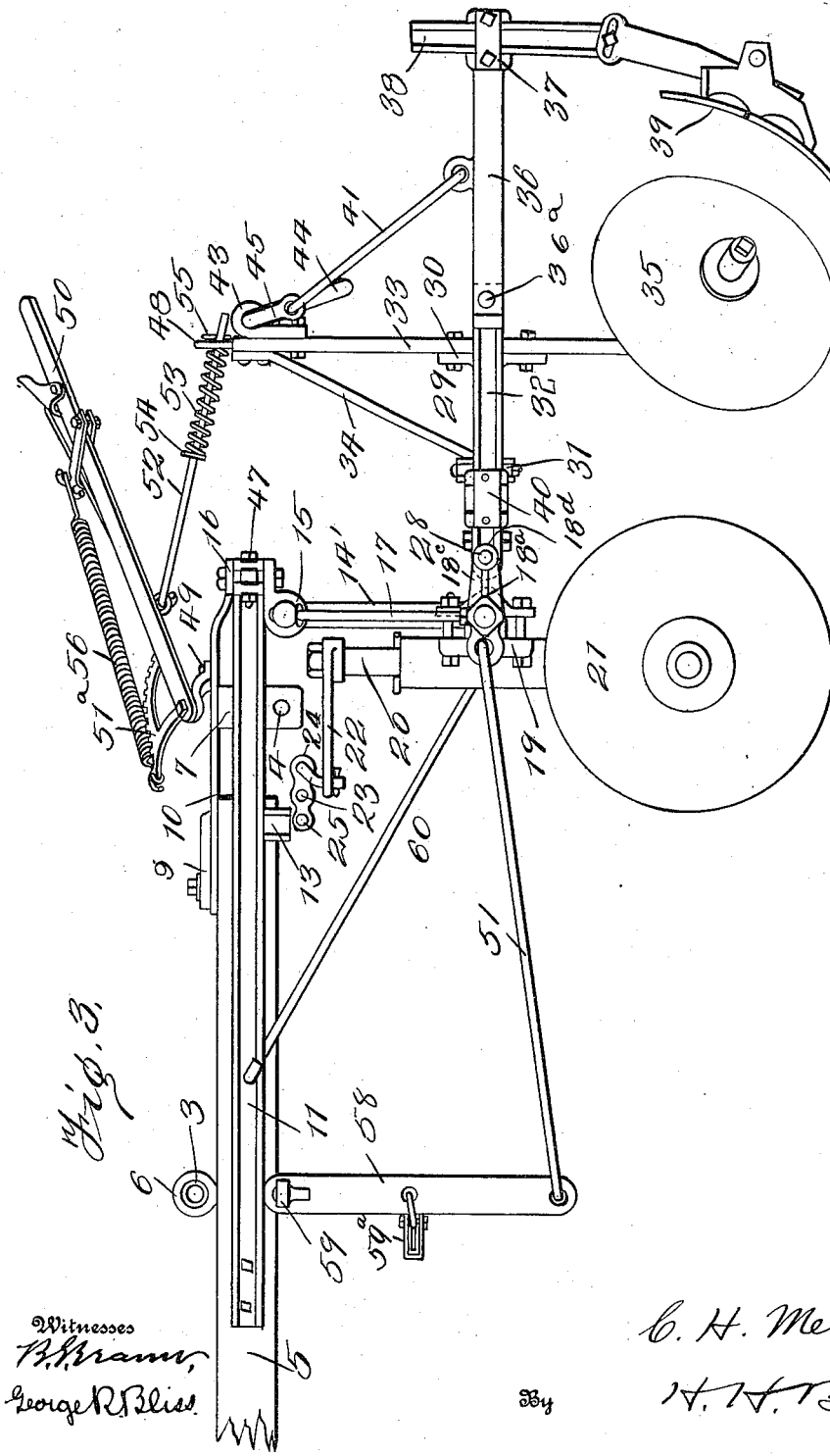

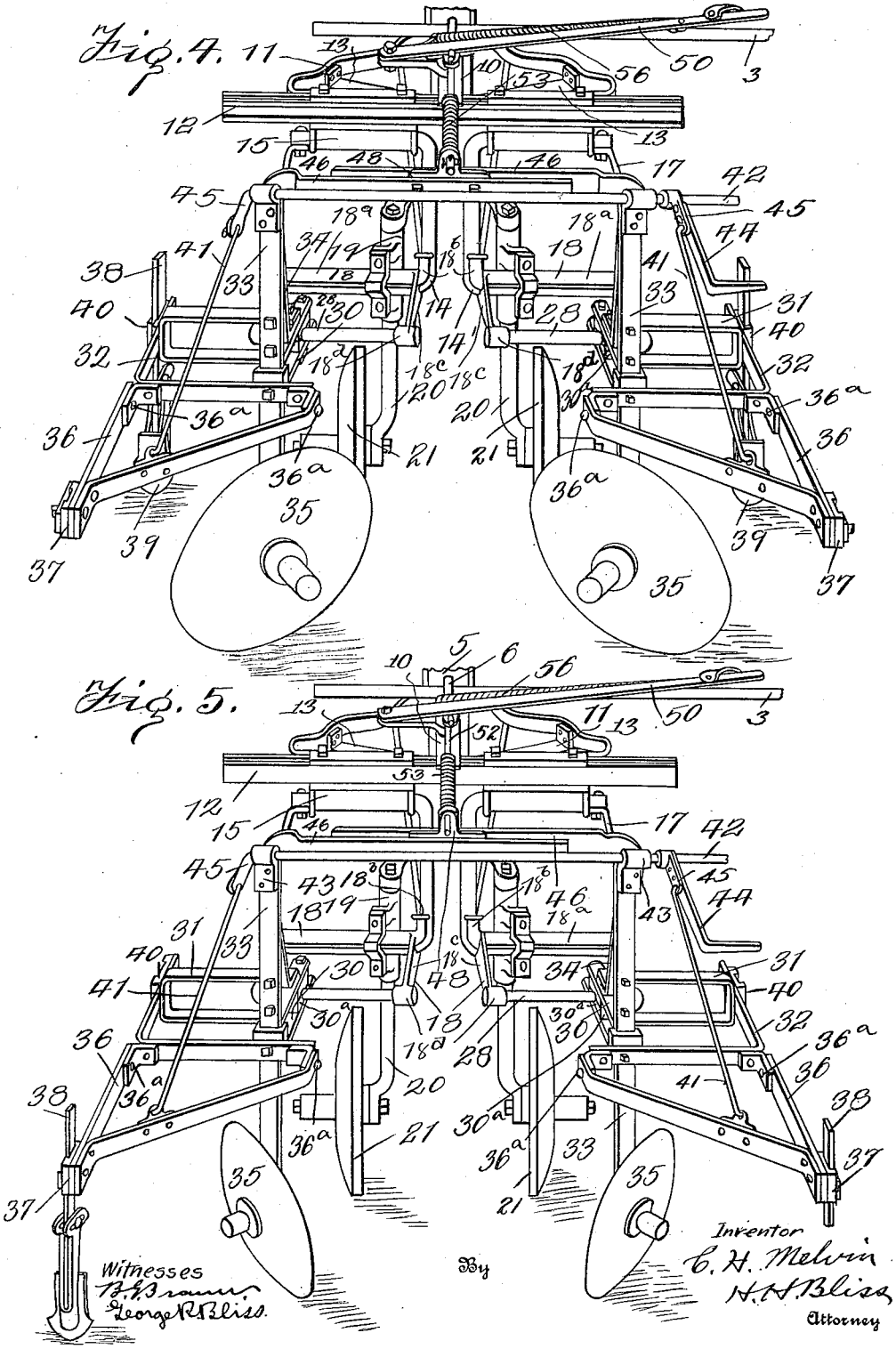

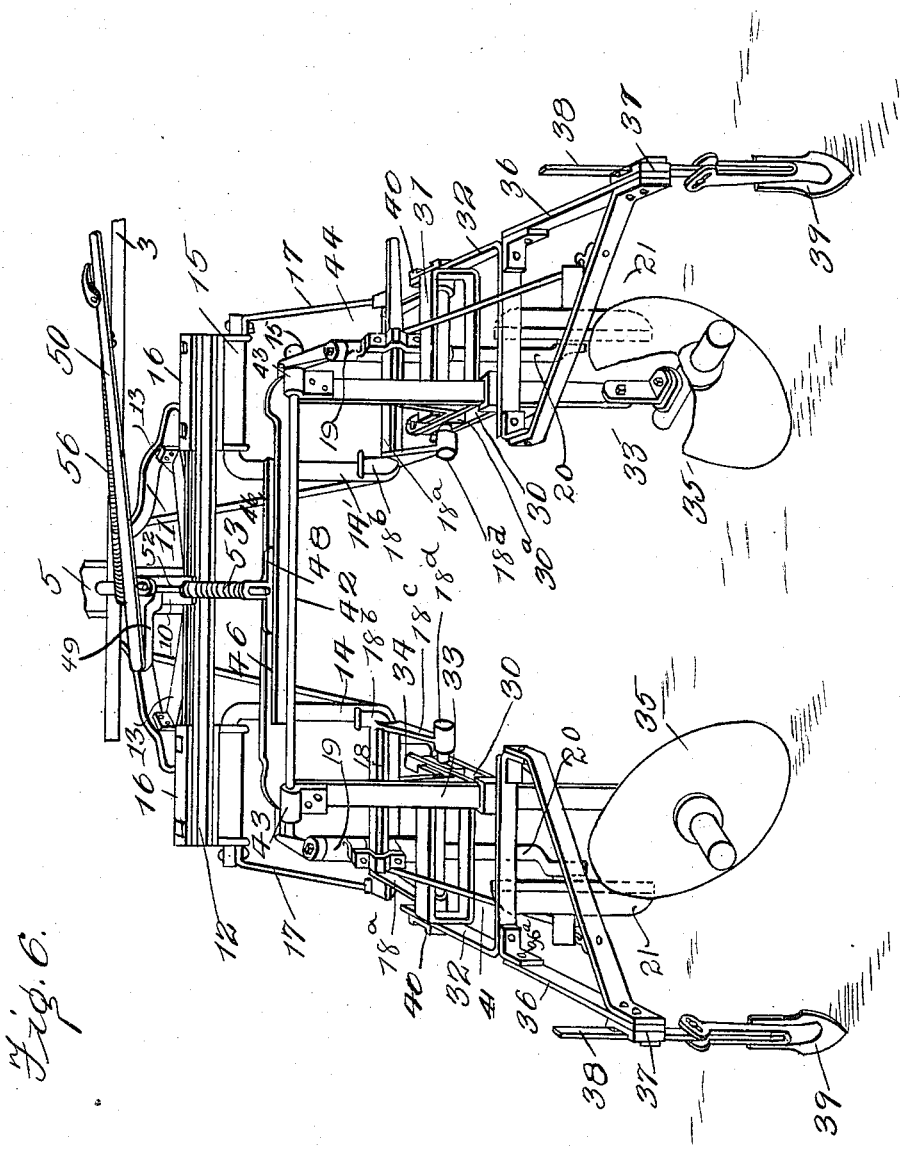

CHARLES H. MELVIN, OF MOLINE, ILLINOIS, ASSIGNOR TO DEERE & COMPANY, A CORPORATION OF ILLINOIS.

LISTER-CULTIVATOR.

1,150,380. Specification of Letters Patent. Patented Aug. 17, 1915.

Application filed October 12, 1908. Serial No. 457,356.

*To all whom it may concern:*

Be it known that I, CHARLES H. MELVIN, a citizen of the United States, residing at Moline, in the county of Rock Island and State of Illinois, have invented certain new and useful Improvements in Lister-Cultivators, of which the following is a specification, reference being had therein to the accompanying drawing.

This invention relates to cultivators and particularly to lister cultivators, that is cultivators designed for the cultivation of corn planted in the furrows made by lister plows. In cultivators of this sort, small solid disk wheels are used to support the frame parts which travel in the furrow upon either side of its center line. In the case of a two-row cultivator it has been found necessary to so mount the tool-carrying frames that they may have freedom of movement toward and from each other, so that the supporting wheels may accommodate themselves to the deviations of the furrows from the straight line.

One of the objects of my invention is to provide improved mechanism for permitting this freedom of movement of the tool frames transversely of the cultivator, which will at the same time tend to return the frames after such a transverse movement as speedily as possible to their normal positions.

Other objects of my invention will be manifest from a reading of the specification and drawings and some of these objects are not necessarily limited to a two-row cultivator only, but are equally desirable of attainment with one-row cultivators.

In the drawings, Figure 1 is a plan view of the cultivator with the tools arranged for the first cultivation. Fig. 2 is a detail plan view of one of the tool-carrying frames. Fig. 3 is a view in side elevation of the same. Fig. 4 is a rear perspective view of the same, showing the tools arranged for the first cultivation. Fig. 5 is of a similar view, showing the parts arranged for the second cultivation. Fig. 6 is a rear perspective view of one of the tool frames, showing the tools arranged for the third cultivation.

The machine consists of the main or seat frame upon which the seat and levers are mounted and the cultivator frames secured to the seat frame, one at each side of the machine and carrying the supporting wheels and cultivating tools. The seat frame is made up of the seat bar 1, carrying at its rear end the seat 2, and the cross bars 3, 4, which are rigidly attached to the seat bar 1. The tongue 5 of each of the cultivator frames is secured to the cross bars 3 and 4 in a manner to provide a combined sliding and pivotal engagement in each case. To accomplish this result, cross bar 3 is loosely passed through the eye of the eye-bolts 6 which are swiveled or pivotally mounted in the tongues 5, respectively, and the rear ends of the tongues 5 are bolted or otherwise pivotally attached to the movable slide bars 7 on the cross bar 4. This mode of connecting the tongues to the main frame permits the two cultivator frames to approach each other, or to recede from each other, when the irregularities of the furrows require such relative movement, and at the same time makes it possible for one tongue to be pulled ahead of the other without throwing the parts out of adjustment or out of their straight line of travel. The usual slight play or relative motion allowed by loose connections between the parts and by the elasticity of the cross bars will permit a slight pantograph movement of the frames relative to each other. This pantograph movement is limited by the rigid attachment of the seat bars to them, which prevents the cross bars from approaching each other at their centers. It has been found in practice that one of the tongues can be pulled a foot or more ahead of the other before the rigid character of the connections between the cross bars and the seat bar puts a positive stop to any further relative movement of the frame parts.

The sliding movement of the cultivator frames upon the main frame is equalized on each side of the machine by means of the lever 8 medially pivoted to the seat bar 1 between the cross bars and the links 9, 9, which pivotally connect opposite arms of this lever 8 with the tongues 5, 5. In this manner the seat bar is maintained in a position midway between the tongues irrespective of the positions of the latter in respect to the seat frame.

Describing now one of the cultivator frames, the tongue 5 is rigidly attached by an end bracket or strap 10 and side braces 11, 11 to a rear transverse frame bar 12, which is shown comprising two beams bolted together. This rigid draft frame is further strengthened by means of the cross bar 13 bolted to the side braces 11 and to the tongue 5. The bar 12 is mounted upon a divided arch 14, 14', each one-half of which is pivotally mounted on a horizontal axis in one of the sleeve bearings 15, which latter are adjustably secured by clamps 16 to the transverse frame member 12. Each of these arch members 14, 14' is a U-shaped tube having a vertical part corresponding to the bottom of the U and an upper and lower horizontal part, the upper journaled as before said, in one of the sleeve bearings 15, and the lower carrying one of the frames upon which are mounted the supporting wheels and the cultivator rigs. The brace rods 17 are shown as connecting the outer ends of the horizontal parts of these arch members.

Sleeved upon the lower horizontal part of each of the U-shaped members is a frame piece 18 which is held against rotation by means of an upstanding arm 18$^b$ which engages the vertical part of the U-shaped member 14 or 14'. That part 18$^a$ of each frame piece which is sleeved upon the corresponding arch member is square in its exterior cross sectional outline. Upon these square parts are adjustably clamped the bearing boxes 19 of the pivotal wheel-carrying standards or caster spindles 20. These pivot standards or caster spindles carry the pivotal supporting wheels 21. Braces 60, 60 are provided which connect the inner ends of the frame pieces 18 with the forward part of the cultivator frame. Preferably these braces 60, 60 are connected to the braces 11, 11. Means are provided for castering the two supporting wheels of each pair in unison. Such means comprises the crank arms 22, 22, the connecting rods 23, 23, which are adjustably secured together in the transversely movable block 24, and the link 25 connecting this block 24 to the lever 26. This lever 26 is pivoted to the cross bar 4 at a point adjacent the seat bar and is provided with the usual segmental rack 27 and the spring actuated manually releasable dog mechanism for fixing the lever in any desired position of adjustment.

In Fig. 1 the cultivator is shown with the parts in normal position. The centers of the two cultivator frames are separated from each other by a distance equal to twice the distance between rows, alternate rows being cultivated at one time. When the parts are in this normal position, the supporting wheels 21, 21 are parallel with each other and with the longitudinal parts of the frame. The cultivator frames are, however, free to move transversely relatively to each other in accordance with variations in the distance between the rows. By means of the lever 8 and the links 9, 9, which have been described, the main or seat frame is maintained in a central position midway between the two cultivator frames.

It will be observed that while the supporting wheels are carried by the cultivator or tool frame, the levers for castering these wheels are mounted upon the main frame. Assuming the hand levers 26, 26, to be in fixed positions of adjustment, the links 25, 25 will cause the supporting wheels to be inclined inward when the cultivator frames are moved outward by the engagement of the wheels with the sides of the furrows. This inward inclination of the wheels at once tends to return the cultivator frames inward to their normal positions. Similarly, the supporting wheels will be inclined outward when the cultivator frames are moved inward and there will at once be a tendency for the wheels, because of their inclination, to return the frames outward to their normal positions. The normal transverse distances between the cultivator frames can be regulated by changing the positions of the levers 26, 26. Any tendency of one team to move ahead of the other is resisted by the corresponding castering movement of the supporting wheels out of parallelism with the line of motion of the machine. This castering movement of the wheels is resisted and prevented by the engagement of the wheels with the walls of the furrows. Rearward extending lugs 18$^c$, 18$^c$ are provided at each end of each of the frame pieces 18. At the rear ends of these lugs are bearings 18$^d$, 18$^d$, and in the bearings of each frame piece is journaled a transverse rod or bar 28. On each rod 28 is adjustably clamped the rig frame 29, the horizontal double bar 30 of which is secured thereon by means of a clamp 30$^a$.

Each of the rig frames comprises in addition to the horizontal supporting bar 30, a forward transverse double bar beam 31, a right-angled bar 32, secured at its forward end to the cross bar 31 and at its inner end to the rear end of supporting bar 30, an upright bar 33 at the rear end of the bar 30 and a brace rod 34 connecting the forward horizontal part of the rig frame with the upright bar 33 near its upper extremity. A cultivator disk 35 is mounted upon the lower end of the upright 33 in a manner to permit its universal adjustment with respect to the rig frame. This adjustment is preferably made possible, as indicated in Fig. 6, by means of an intermediate bracket having a pivotal rose plate connection with the upright 33, and also having a pivotal rose plate connection with the spindle upon upon which the disk is mounted, the axes of the two pivotal connections being at substantially right angles.

The supplementary tool frame 36 is pivotally connected to the rig frame at its rear end at 36$^a$, 36$^a$ so that it can be free to swing about a horizontal transverse axis. This supplementary frame is provided with a tool-holding clamp 37 at its rear end in which is mounted the arm 38 carrying at its lower end the cultivator blade 39. This cultivator blade can be shifted to a position in front of the cultivator disk 35 by removing it from the tool-holding clamp 37 and fastening it in position at the forward end of the rig frame in the clamp 40.

The two supplementary blade-carrying frames of each rig can be simultaneously swung upwardly by means of the lifting rods 41, the rock shaft 42, the latter being journaled in brackets 43 bolted to the rear upper side of the uprights 33, and the hand lever 44 adjustably secured to the rock shaft. The rock shaft is connected to the lifting rods 41 by means of the short crank arms 45 one of which is adjustably secured to the rock shaft and extended to form the hand lever 44. It will be noted that when the parts are in the positions shown in Fig. 3 the rear part of the rig frame is locked against upward movement. The operator can, however, by means of the hand lever 44 easily release the lock and elevate the rear part.

Each of the uprights 33 is provided at its upper end with an inwardly projecting integral horizontal extension 46 adapted to overlap the extension of the other upright and to be clamped in any one of a number of positions of adjustments to the said other extension. The clamping bolts 47, by which these two horizontal arms 46 are secured together serve, at the same time, to bind in position between the two arms, the abutment plate 48. Rigidly mounted upon the tongue strap 10 is a bracket 49 on which is pivotally mounted the hand lever 50 and with the bracket is integrally formed the segment rack 51ª designed to coöperate with the usual spring-actuated manually releasable dog mechanism upon the lever arm 50 to fix the said arm in any one of a number of positions as desired. The rod 52 serves to connect the lever 50 with the rig frames, it being pivotally connected with the former near its inner end, and slidably positioned in a circular aperture in the abutment plate 48, its forward movement relative to the abutment plate being limited by the cotter pin 55.

A spring 53, sleeved upon the rod 52, abuts at one end against the collar 54 rigidly secured upon the rod and at the other end against the abutment plate 48. A tension spring 56 connects the segment rack 51 to the outer end of the hand lever 50 and assists the operator in moving the lever forward to raise the rig frames. The spring 53 enables the operator to move the lever 50 as far back as desired at the beginning of the row without positively shoving the soil-engaging tools into the ground, the spring 53 being compressed at that time and expanded gradually as the condition of the ground may permit until the tools are forced down to the desired depth.

At the rear end of each of the rig frames there is pivotally connected at 36ª, 36ª a supplementary tool frame 36. Each supplementary frame is provided with a tool-holding clamp 37 at its rear end in which is mounted the arm 38 carrying at its lower end the cultivator blade 39. This cultivator blade can be shifted to a position in front of the cultivator disk 35 by removing it from the tool-holding clamp 37 and fastening it in position at the forward end of the rig frame in the clamp 40.

The two supplementary blade-carrying frames can be simultaneously swung upward by means of the lifting rods 41, the rock shaft 42, the latter being journaled in brackets 43 bolted to the rear upper side of the uprights 34, and the hand lever 44 adjustably secured to the rock shaft. The rock shaft is connected to the lifting rods 41 by means of the short crank arms 45, one of which is adjustably secured to the rock shaft and extended to form the hand lever 44.

That the machine may be balanced and the draft applied to the frame at such a distance above the ground as to hold the tools to their work, connecting rods 51 are attached at one end to the forward part of the rectangular frame piece 18 and at the other end to vertical bars 58 which depend from the doubletree 59 and to which are medially secured the swingletrees 59ª. The arch members and parts carried rigidly thereby are held in fixed position relative to the upper horizontal frame work 11, 12 by means of the rods or braces 60 which have been before referred to. The ends of the braces are formed with hooks which engage apertures in the frame pieces 18 and in the side brace 11. This manner of engagement allows a universal swinging of the rods with respect to the parts to which they are secured within certain limits. When the arch members 14, 14' are moved transversely along the frame bar 12 and clamped in some new position of adjustment, these rods 60 adapt themselves to the new position without requiring the attention of the operator.

For the first cultivation, the parts of the implements are arranged as shown in Fig. 4. The half members of the arch 14, 14' are brought close together, the disks 35 are arranged to throw dirt outwardly and to cut the weeds from the bottom and side of the furrow on either side of the corn and the blades 39 are fixed in their forward position to remove weeds from the top of the ridge and loosen the earth which has been packed by the tread of the horses.

For the second cultivation, the machine is arranged, as shown in Fig. 5, the disks being inclined inwardly and rearwardly to partially fill the furrow around the stalks of the young plants, and the cultivator blades are shifted to the rear holder upon the swinging supplemental frame 36.

For the third cultivation when the plants have reached a later stage of development, the half members of the rig-supporting arches are moved apart as shown in Fig. 6, and the disks set at a greater angle of inclination to throw what is left of the ridges into the furrow to completely level the ground about the corn, the cultivator blades acting, as in the second stage, to loosen up the ground which has been packed down by the horses and to remove any foreign growth which may be present. The supporting wheels are moved from their inner positions upon the half members of the arch which they occupied during the first two stages of cultivation to positions well out toward the other ends of the arch members. During this third cultivation, the land cannot be depended upon to guide the supporting wheels 21 and the lever 26 only is relied upon to hold the wheels to their normal position.

When it is so desired, the swinging supplemental frames 36 can be swung upwardly and the disks 35 used alone to cultivate the plants.

What I claim is:

1. In a cultivator, the combination of a main frame, two tool-carrying frames one at each side of the main frame and bodily movable with respect thereto, supporting wheels for each of said tool frames, each wheel being adjustable about an upright axis normally fixed with respect to the corresponding tool frame, and lever mechanism mounted on the main frame for adjusting the said wheels about the said axes.

2. In a cultivator, the combination of a main frame, two tool-carrying frames one at each side of the main frame and movable with respect thereto, supporting wheels for each of said tool frames, each wheel being adjustable with respect to the main frame and the corresponding tool frame about an upright axis normally fixed with respect to the tool frame, and lever mechanism mounted on the main frame for adjusting the said wheels about the said axes.

3. In a cultivator, the combination of a main frame, tool-carrying frames secured one to each side of the main frame in a manner to permit transverse movements with respect to the main frame, supporting wheels for each of the tool-carrying frames, means for angularly adjusting the wheels of one frame, a second independent means for angularly adjusting the wheels of the other frame, levers mounted upon the main frame operatively connected to the two adjusting means, respectively, and means for fixing each of said levers in any one of a number of positions relative to the main frame.

4. In a cultivator, the combination of a main frame, tool-carrying frames secured one to each side of the main frame in a manner to permit transverse movements with respect to the main frame, supporting wheels for each of the tool-carrying frames, means for angularly adjusting the wheels of one frame, a second independent means for angularly adjusting the wheels of the other frame, levers mounted upon the main frame operatively connected to the two adjusting means, respectively, means for fixing each of said levers in any one of a number of positions relative to the main frame, and equalizing means connecting the main frame to the tool-carrying frames for maintaining the main frame in a central position with respect to the tool-carrying frames irrespective of the transverse movements of the latter.

5. In a cultivator, the combination of a main frame, tool-carrying frames secured one to each side of the main frame in a manner to permit transverse movement with respect to the main frame, pairs of supporting wheels one for each tool carrying frame, and means for angularly adjusting each pair of supporting wheels, said means being operated by movements of the tool-carrying frames transversely with respect to the main frame.

6. In a cultivator, the combination of a main frame, a tool-carrying frame secured to one side of the main frame and a tool-carrying frame secured to the other side of the main frame, each in a manner to permit angular movement of the tool-carrying frame in horizontal planes with respect to the main frame and to permit transverse movement of the tool-carrying frame with respect to the main frame, sets of supporting wheels one for each tool-carrying frame, means for each set of supporting wheels operable by the transverse movement of the tool-carrier frame with respect to the main frame to angularly adjust the wheels.

7. In a cultivator, the combination of a pair of cultivator mechanisms adapted to simultaneously cultivate two rows of plants, a central frame joining the two mechanisms on which each is free to slide laterally, supporting wheels for each mechanism, vertical spindles therefor adapted to be angled about vertical axes, and systems of devices connecting each spindle with the central frame, and tending to automatically retard any angling of the wheels resulting from the action upon them of the walls of a furrow.

8. In a lister cultivator, the combination of a main frame, two tool frames connected with the main frame, supporting wheels for the tool frames arranged with their ground contacting points all in the same transverse line, means for holding the wheels against forward or backward movement with respect to the tool frames or the main frame, forward extending tongues for supporting and balancing the said main and tool frames, two pairs of disk-carrying frames connected respectively to the tool frames and vertically adjustable relatively thereto, disks on the disk frames and arranged on opposite sides of the respective plant rows, two pairs of blade-carrying frames, respectively connected to and carried by the disk-carrying frames to be movable therewith but vertically adjustable relatively thereto, and cultivator blades on the blade-carrying frames.

9. In a cultivator, the combination of a tongue frame, a pair of vertically depending bars 14, 14' hinged to the rear end of the frame on a horizontal transverse axis, and transversely slidable thereon, a wheel mounting secured to each of said bars, tool supporting mechanism mounted on each of said bars, a pair of swinging hitch rods 58 depending from forward parts of the tongue frame, a pair of tension rods each universally connected at its forward end of the lower end of one of the hitch rods, and at its rear end to one of the depending rods 14, 14', and a pair of supplemental rods each universally connected at its forward end to forward parts of the tongue frame and at its rear end to one of the depending rods 14, 14'.

10. In a cultivator, the combination of a pair of cultivating mechanisms adapted to cultivate simultaneously two rows of plants, a frame joining the two cultivating mechanisms, supporting wheels for each mechanism, means for holding the forward parts of the said supporting wheels transversely stationary with respect to the uniting frame, the rear parts of the supporting wheels being free to move transversely so as to angle the supporting wheels about their forward edge parts as a vertical axis.

11. In a cultivator, the combination of two cultivator mechanisms adapted to cultivate simultaneously two rows of plants, a frame uniting the two mechanisms to which each of the said cultivating mechanisms is slidably connected and supporting wheels for each of the said cultivating mechanisms adapted to be angled with respect to the cultivating mechanisms about their vertical diameters as an axis and with respect to the uniting frame about a vertical axis in front of the vertical diameter.

12. In a cultivator, the combination of a main frame, a tool-carrying frame secured to one side of the main frame in a manner to permit transverse movement with respect thereto, a second tool-carrying frame secured to the other side of the main frame in a manner to permit transverse movement with respect thereto, supporting wheels for each of the tool-carrying frames, means for angling each of the supporting wheels with respect to its tool-carrying frame about its vertical diameter as an axis and with respect to the main frame about a vertical axis in front of its vertical diameter, and means for adjusting transversely the positions of the said vertical axes about which the wheels are angled with respect to the main frame.

13. In a cultivator, the combination of a main frame, a tool-carrying frame secured to one side of the main frame in a manner to normally permit transverse bodily movement with respect thereto, a second tool-carrying frame secured to the other side of the main frame in a manner to normally permit transverse bodily movement with respect thereto, and means interposed between the respective tool-carrying frames and the main frame tending to maintain the tool-carrying frame in definite positions with respect to each other and to the main frame, the said means being automatically yieldable to permit relative transverse movement of the tool-carrying frames.

14. In a cultivator, the combination of a main frame, a tool-carrying frame secured to one side of the main frame in a manner to normally permit transverse bodily movement with respect thereto, a second tool-carrying frame secured to the other side of the main frame in a manner to normally permit transverse bodily movement with respect thereto, means interposed between the respective tool-carrying frames and the main frame tending to maintain the former in definite positions with respect to the latter, the said means being automatically yieldable to permit relative transverse movement of the tool-carrying frames, and mechanism within the control of the operator for adjusting the said means to vary the normal distance between the said tool-carrying frames.

15. In a cultivator, the combination of a main frame, a tool-carrying frame secured to one side of the main frame in a manner to permit transverse movement with respect thereto, a second tool-carrying frame secured to the other side of the main frame in a manner to permit transverse movement with respect thereto, supporting wheels for the tool-carrying frames, each adapted to be angled about a vertical axis, and automatic mechanism for angling the said wheels, the mechanism serving when the frames are moved out of normal positions to incline the wheels in directions such that they tend to return the frames to normal positions as the cultivator advances.

16. In a cultivator, the combination of a main frame, a tool-carrying frame secured to one side of the main frame, in a manner to permit transverse movement with respect thereto, a second tool-carrying frame secured to the other side of the main frame in a manner to permit transverse movement with respect thereto, supporting wheels for the tool-carrying frames each adapted to be angled about a vertical axis, automatic mechanism for angling the said wheels, the mechanism serving when the frames are out of normal positions to incline the wheels in directions such that they tend to return the frames to normal positions as the cultivator advances, and devices within the control of the operator for adjusting the said automatic mechanism to change the normal positions of the frames.

17. In a cultivator, the combination of a main frame, a tool-carrying frame secured to one end of the frame in a manner to permit transverse movement with respect thereto, supporting wheels for the tool-carrying frame each adapted to be angled about a vertical axis, automatic mechanism for angling the said wheels, the mechanism serving when the tool-carrying frame is moved out of normal position to incline the wheels in a direction such that they tend to return the frame to its normal position as the cultivator advances, a second tool-carrying frame secured to the other side of the main frame in a manner to permit transverse movement with respect thereto, supporting wheels for the second tool-carrying frame each adapted to be angled about a transverse axis, and a second automatic mechanism for angling the wheels of the second tool-carrying frame, the said mechanism serving when the tool-carrying frame is moved out of normal position to incline the wheels in a direction such that they tend to return the frame to its normal position as the cultivator advances.

18. In a cultivator, the combination of a main frame, a tool-carrying frame secured to one end of the frame in a manner to permit transverse movement with respect thereto, supporting wheels for the tool-carrying frame each adapted to be angled about a vertical axis, automatic mechanism for angling the said wheels, the mechanism serving when the tool-carrying frame is moved out of normal position to incline the wheels in a direction such that they tend to return the frame to its normal position as the cultivator advances, a second tool-carrying frame secured to the other side of the main frame in a manner to permit transverse movement with respect thereto, supporting wheels for the second tool-carrying frame each adapted to be angled about a vertical axis, a second automatic mechanism for angling the wheels of the second tool-carrying frame, the said mechanism serving when the tool-carrying frame is moved out of normal position to incline the wheels in a direction such that they tend to return the frame to its normal position as the cultivator advances, and an automatically acting device for maintaining the main frame central with respect to the tool-carrying frames.

19. In a cultivator, the combination of a main frame, two tool-carrying frames secured to the main frame, one at each side thereof, in a manner to permit transverse movement with respect thereto, supporting wheels for the tool-carrying frames each adapted to be angled about a vertical axis, an automatic mechanism for angling the wheels of one tool-carrying frame, a second mechanism for angling the wheels of the other tool-carrying frame, each of the said mechanisms serving, when the frame with which it is associated is moved out of normal position, to incline the wheels of the said frame in a direction such that they tend to return the frame to its normal position as the cultivator advances, an automatically acting device for maintaining the main frame central with respect to the tool-carrying frames, and means within the control of the operator for adjusting the automatic angling mechanism to change the normal positions of the tool-carrying frames.

20. The combination with a cultivator frame, of two downward extending transverse elements secured to the frame and transversely adjustable with respect thereto, supporting wheels one secured to each of the said elements in a manner to permit transverse adjustment with respect thereto, and tool-carrying rig frames one secured to each of the elements in a manner to permit transverse adjustment with respect thereto, the said wheels and rig frames throughout the entire range of adjustment being each movable with respect to its element independently of the other.

21. In a lister cultivator, the combination of a main frame, a tool frame connected with the main frame, supporting wheels for the main and tool frames, means for holding the wheels against forward or backward movement with respect to the tool frame or the main frame, a rig frame connected to the tool frame for movement about a transverse horizontal axis, and comprising two pivotally connected parts, means for moving the rig frame about the said axis, a soil working device connected to the forward part of the rig frame, a soil working device connected to the rear part of the rig frame, and means for locking the two parts of the rig frame in fixed positions relative to each other, or for elevating the rear part with respect to the forward part about its axis of pivotal connection.

22. In a lister cultivator, the combination of a main frame, a tool frame connected with the main frame, supporting wheels for the main and tool frames, means for holding the wheels against forward or backward movement with respect to the tool frame or the main frame, two rig frames connected to the tool frame for movement about a transverse horizontal axis, each of the said rig frames comprising two pivotally connected parts, means for moving the rig frames about the said transverse horizontal axis, soil working devices connected with the forward parts of the rig frames, soil working devices connected with the rear parts of the rig frames, and means for locking the two parts of both rig frames in fixed positions relative to each other or for simultaneously elevating the rear parts of both frames with respect to the forward parts.

23. In a lister cultivator, the combination of a main frame, a tool frame connected with the main frame, supporting wheels for the main and tool frames, means for holding the wheels against forward or backward movement with respect to the tool frame or the main frame, two rig frames connected to the tool frame for movement along or about a transverse horizontal axis and each comprising two pivotally connected parts, means for moving the frames about the said transverse horizontal axis, soil working devices connected with the forward parts of the rig frames, soil working devices connected with the rear parts of the rig frames, and means for simultaneously locking the two parts of both rig frames in fixed positions relative to each other or for simultaneously elevating the rear parts with respect to the forward parts, the said means being operative for all positions of transverse adjustment of the frames.

24. In a lister cultivator, the combination of a main frame, two tool frames connected with the main frame, supporting wheels for the main and tool frames angularly adjustable about vertical axes and arranged with their ground-engaging points and the said axes all in the same transverse vertical plane, means for holding the wheels against forward or backward movement with respect to the tool frames or the main frame, the said frames being freely movable about the common transverse axes of the wheels, forward extending tongues for supporting and balancing the main and tool frames, and tool-carrying rig frames connected to the tool frames for movement with respect thereto about fixed transverse horizontal axes.

25. In a lister cultivator, the combination of a main frame, two tool frames connected with the main frame, supporting wheels for the main and tool frames angularly adjustable about vertical axes and arranged with their ground-engaging points and the said axes all in the same transverse vertical plane, means for holding the wheels against forward or backward movement with respect to the tool frames or the main frame, the said frames being freely movable about the common transverse axes of the wheels, forward extending tongues for supporting and balancing the main and tool frames, tool-carrying rig frames connected to the tool frames for movement with respect thereto about fixed transverse horizontal axes, and manually controllable means for moving the said supporting wheels angularly to different positions.

26. In a cultivator, the combination of a main frame, a tool-carrying frame secured to one side of the main frame in a manner to permit transverse movement with respect thereto, a second tool frame secured to the other side of the main frame in a manner to permit transverse movement with respect thereto, supporting wheels for the tool frames each adapted to be angled about a vertical axis, automatic mechanism for angling the said wheels, the mechanism serving when the frames are out of normal positions to incline the wheels in directions such that they tend to return the frames to normal positions as the cultivator advances, and devices mounted on the main frame within the control of the operator for adjusting the said automatic mechanism to change the normal positions of the frames.

27. In a lister cultivator, the combination of a main frame, two tool frames connected one to each side of the main frame, two supporting wheels for each tool frame each wheel being adapted to be angled with respect to its frame about a vertical axis, and connecting devices between the supporting wheels of one tool frame and the supporting wheels of the other tool frame for causing the simultaneous angling of all of the wheels.

28. In a lister cultivator, the combination of a main frame, two tool frames connected one to each side of the main frame, supporting wheels for the tool-carrying frames each adapted to be angled with respect to its tool frame about a vertical axis, and a connecting device between the supporting wheels of one tool frame and the supporting wheels of the other tool frame for causing all of the wheels to be simultaneously angled inward or simultaneously angled outward.

29. In a lister cultivator, the combination of a main frame, two tool frames connected one to each side of the main frame, two supporting wheels for each tool frame each wheel being adapted to be angled with respect to its frame about a vertical axis, manually controllable means for angling the supporting wheels for one tool frame, and connecting devices between the supporting wheels for the said frame and those for the other frame to effect adjustment of the wheels of the second said frame simultaneously with those of the first.

30. In a lister cultivator, the combination of a main frame, two tool frames connected one to each side of the main frame in a manner to permit transverse movement with respect thereto, supporting wheels for the tool frames, each adapted to be angled with respect to its frame about a vertical axis, connections between each wheel and the main frame for angling the wheel when there is relative movement between the main frame and the corresponding tool frame, and a connecting device between the supporting wheels of one tool frame and the supporting wheels of the other tool frame for causing the simultaneous angling of the wheels.

31. In a lister cultivator, the combination of a main frame, two tool frames connected one to each side of the main frame in a manner to permit transverse movement with respect thereto, supporting wheels for the tool frames, each adapted to be angled with respect to its frame about a vertical axis, connections between each wheel and the main frame for angling the wheel when there is relative movement between the main frame and the corresponding tool frame, and a connecting device between the supporting wheels of one tool frame and the supporting wheels of the other tool frame for causing the wheels of both frames to be simultaneously angled inward or to be simultaneously angled outward.

32. In a lister cultivator, the combination of a main frame, two tool frames connected one to each side of the main frame in a manner to permit transverse movement with respect thereto, supporting wheels for the tool frame each adapted to be angled with respect to its frame about a vertical axis, connections between the main frame and the supporting wheels for one tool frame whereby the wheels are angled when there is relative movement between the main frame and the corresponding tool frame, manually controllable means for adjusting the said connections, and a connecting device between the supporting wheels for one frame and the supporting wheels for the other frame to cause simultaneous angling of all of the wheels.

33. In a lister cultivator the combination of a main frame, two tool frames connected one to each side of the main frame in a manner to permit transverse movement with respect thereto, supporting wheels for the tool frame each adapted to be angled with respect to its frame about a vertical axis, connections between the main frame and the supporting wheels for each tool frame adapted to cause angling of the supporting wheels when there is relative movement between the corresponding tool frame and the main frame, manually controllable means for adjusting the said connections, and a connecting device between the supporting wheels of the two frames whereby the angling movement of the wheels of one frame is transmitted to simultaneously angle the wheels of the other frame.

In testimony whereof I affix my signature in presence of two witnesses.

CHARLES H. MELVIN.

Witnesses:
 EUGENE L. TAYLOR,
 ROY E. ANDERSON.

Copies of this patent may be obtained for five cents each, by addressing the "Commissioner of Patents, Washington, D. C."